US012618783B2

(12) United States Patent (10) Patent No.: US 12,618,783 B2
Miki et al. (45) Date of Patent: May 5, 2026

(54) PIPE INSPECTION METHOD

(71) Applicant: Hitachi GE Vernova Nuclear Energy, Ltd., Ibaraki (JP)

(72) Inventors: Masahiro Miki, Tokyo (JP); Kaname Saga, Tokyo (JP); Yoshizumi Fukuhara, Hitachi (JP); Junta Yamada, Hitachi (JP); Michiaki Kurosaki, Hitachi (JP); Akihiko Hirano, Hitachi (JP)

(73) Assignee: HITACHI GE VERNOVA NUCLEAR ENERGY, LTD., Ibaraki (JP)

( * ) Notice: Subject to any disclaimer, the term of this patent is extended or adjusted under 35 U.S.C. 154(b) by 266 days.

(21) Appl. No.: 18/389,906

(22) Filed: Dec. 20, 2023

(65) Prior Publication Data

US 2024/0219317 A1 Jul. 4, 2024

(30) Foreign Application Priority Data

Dec. 28, 2022 (JP) ................................. 2022-211519

(51) Int. Cl.
G01N 21/952 (2006.01)
G06T 7/00 (2017.01)
(52) U.S. Cl.
CPC ......... G01N 21/952 (2013.01); G06T 7/0002 (2013.01); G06T 2207/30108 (2013.01)
(58) Field of Classification Search
CPC ................ G01N 21/952; G06T 7/0002; G06T 2207/30108
See application file for complete search history.

(56) References Cited

U.S. PATENT DOCUMENTS

| | | | |
|---|---|---|---|
| 2016/0238514 A1* | 8/2016 | Denenberg | G06F 17/00 |
| 2017/0153108 A1* | 6/2017 | Kitazawa | G01N 29/348 |
| 2018/0259486 A1* | 9/2018 | Babcock, IV | G02B 27/0172 |
| 2019/0086365 A1* | 3/2019 | Amer | G01N 25/72 |
| 2021/0018426 A1* | 1/2021 | Amer | G01N 17/04 |

FOREIGN PATENT DOCUMENTS

JP 2009-156806 A 7/2009

* cited by examiner

*Primary Examiner* — Thomas M Hammond, III
(74) *Attorney, Agent, or Firm* — MATTINGLY & MALUR, PC

(57) ABSTRACT

A pipe inspection method includes a first process of disposing an outside coil and a camera outside a thermal insulator, a second process of measuring the thickness of a pipe at a position of an ultrasonic sensor fixed in advance to an inside of the thermal insulator and to the outer surface of the pipe, by using the ultrasonic sensor, an inside coil, the outside coil, and a controller, a third process of photographing the thermal insulator with the camera, a fourth process of removing the thermal insulator from the pipe when judging an abnormality in the thickness of the pipe at the position of the ultrasonic sensor or in the appearance of the thermal insulator, a fifth process of disposing another ultrasonic sensor on the outer surface of the pipe, and a sixth process of measuring the thickness of the pipe at the position of the other ultrasonic sensor.

6 Claims, 8 Drawing Sheets

FIG. 8

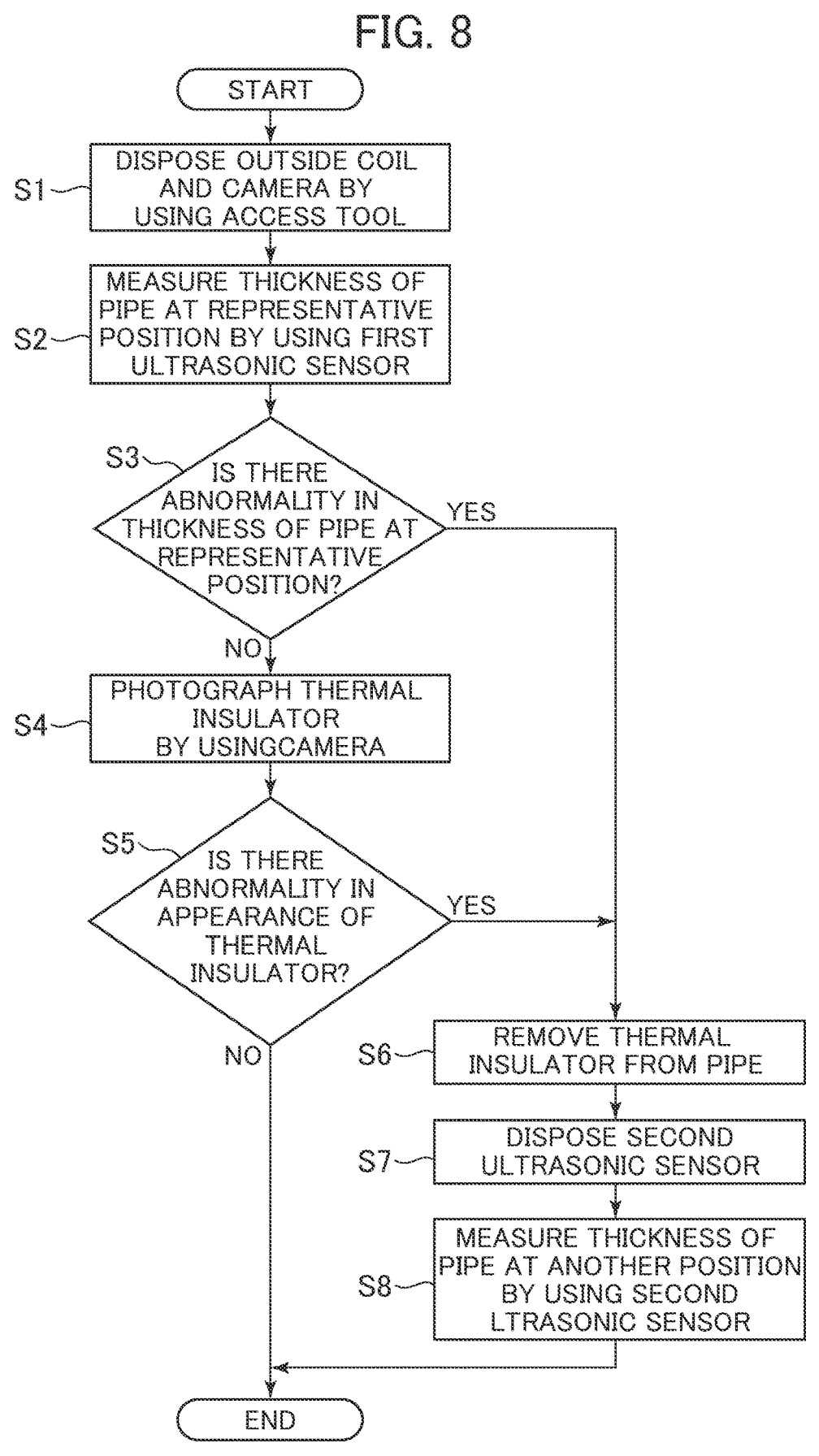

START

S1 — DISPOSE OUTSIDE COIL AND CAMERA BY USING ACCESS TOOL

S2 — MEASURE THICKNESS OF PIPE AT REPRESENTATIVE POSITION BY USING FIRST ULTRASONIC SENSOR

S3 — IS THERE ABNORMALITY IN THICKNESS OF PIPE AT REPRESENTATIVE POSITION?

YES

NO

S4 — PHOTOGRAPH THERMAL INSULATOR BY USINGCAMERA

S5 — IS THERE ABNORMALITY IN APPEARANCE OF THERMAL INSULATOR?

YES

NO

S6 — REMOVE THERMAL INSULATOR FROM PIPE

S7 — DISPOSE SECOND ULTRASONIC SENSOR

S8 — MEASURE THICKNESS OF PIPE AT ANOTHER POSITION BY USING SECOND LTRASONIC SENSOR

END

PIPE INSPECTION METHOD

CROSS-REFERENCE TO RELATED APPLICATION

The present application claims priority from Japanese application JP2022-211519, filed on Dec. 28, 2022, the content of which is hereby incorporated by reference into this application.

BACKGROUND OF THE INVENTION

1. Field of the Invention

The present invention relates to a pipe inspection method.

2. Description of the Related Art

The outer surface of a pipe in a plant is coated with a thermal insulator because fluid at a high temperature flows in the pipe. Further, there is a possibility that the inner surface of the pipe is eroded by the fluid at a high temperature and wall thinning occurs. Thus, an inspection to measure the thickness of the pipe is executed.

A pipe inspection method will be described based on an assumption that a pipe exists at a high place. In a general pipe inspection method, a worker assembles a scaffold for approaching the pipe and executing work. Then, the worker on the scaffold removes a thermal insulator from the pipe, disposes an ultrasonic sensor on the outer surface of the pipe, and measures the thickness of the pipe by using this ultrasonic sensor.

Meanwhile, in a pipe inspection method of Patent Document 1, a worker on a floor uses an access tool to remove an attached/detached part of a thermal insulator (in other words, part that can be attached to and detached from another part of the thermal insulator) disposed at a specific position on the outer surface of a pipe and dispose an ultrasonic sensor at the specific position. The access tool has a rod in which the tip side can hold the ultrasonic sensor and the base end side is grasped by the worker, a hook that is disposed on the tip side of the rod and can engage with the attached/detached part of the thermal insulator, and an operation lever that is disposed on the base end side of the rod and can operate the hook. Using the access tool eliminates the need for assembly of a scaffold and allows reduction in work accompanying the inspection.

PRIOR ART DOCUMENT

Patent Document

Patent Document 1: JP-2009-156806-A

SUMMARY OF THE INVENTION

In the pipe inspection method of Patent Document 1, attachment and detachment of the thermal insulator is inevitably executed although assembly of a scaffold is unnecessary, and therefore, there is room for improvement in terms of reduction in work accompanying the inspection. As a method for avoiding the attachment and detachment of the thermal insulator, there is a possible method in which an ultrasonic sensor is fixed to the inside of the thermal insulator and to the outer surface of the pipe in advance, and the thickness of the pipe is measured by using this ultrasonic sensor. However, in this method, there is a limit on the number of ultrasonic sensors that can be fixed to the outer surface of the pipe for various reasons, and it is difficult to measure the thickness of the pipe at another position other than the position at which the ultrasonic sensor is fixed.

The present invention has been made in view of the above-described circumstances, and an object thereof is to provide a pipe inspection method by which a pipe inspection can be executed with reduction in work accompanying the inspection, such as attachment and detachment of a thermal insulator.

In order to achieve the above-described object, a pipe inspection method of the present invention includes a first process of disposing an outside coil and a camera outside a thermal insulator that coats the outer surface of a pipe, by using an access tool that holds the outside coil and the camera, a second process of measuring the thickness of the pipe at the position of a first ultrasonic sensor fixed in advance to inside of the thermal insulator and to the outer surface of the pipe, by using the first ultrasonic sensor, an inside coil that is disposed inside the thermal insulator in advance and is connected to the first ultrasonic sensor, the outside coil disposed outside the thermal insulator in such a manner as to face the inside coil in the first process, and a controller that executes input and output of signals with the first ultrasonic sensor by using electromagnetic induction between the inside coil and the outside coil, and judging whether or not there is an abnormality in the thickness of the pipe, a third process of photographing the thermal insulator by using the camera disposed outside the thermal insulator in the first process, and judging whether or not there is an abnormality in appearance of the thermal insulator, a fourth process of removing the thermal insulator from the pipe when it is judged that there is an abnormality in the thickness of the pipe in the second process or when it is judged that there is an abnormality in the appearance of the thermal insulator in the third process, a fifth process of disposing a second ultrasonic sensor on the outer surface of the pipe from which the thermal insulator has been removed in the fourth process, and a sixth process of measuring the thickness of the pipe at the position of the second ultrasonic sensor by using the second ultrasonic sensor disposed on the outer surface of the pipe in the fifth process and a controller that executes input and output of signals with the second ultrasonic sensor.

According to the present invention, a pipe inspection can be executed with reduction in work accompanying the inspection, such as attachment and detachment of a thermal insulator.

BRIEF DESCRIPTION OF THE DRAWINGS

FIG. 8 is a flowchart that represents a procedure of a pipe inspection method in the one embodiment of the present invention.

DESCRIPTION OF THE PREFERRED EMBODIMENT

One embodiment of the present invention will be described with reference to the drawings.

Figure 1:
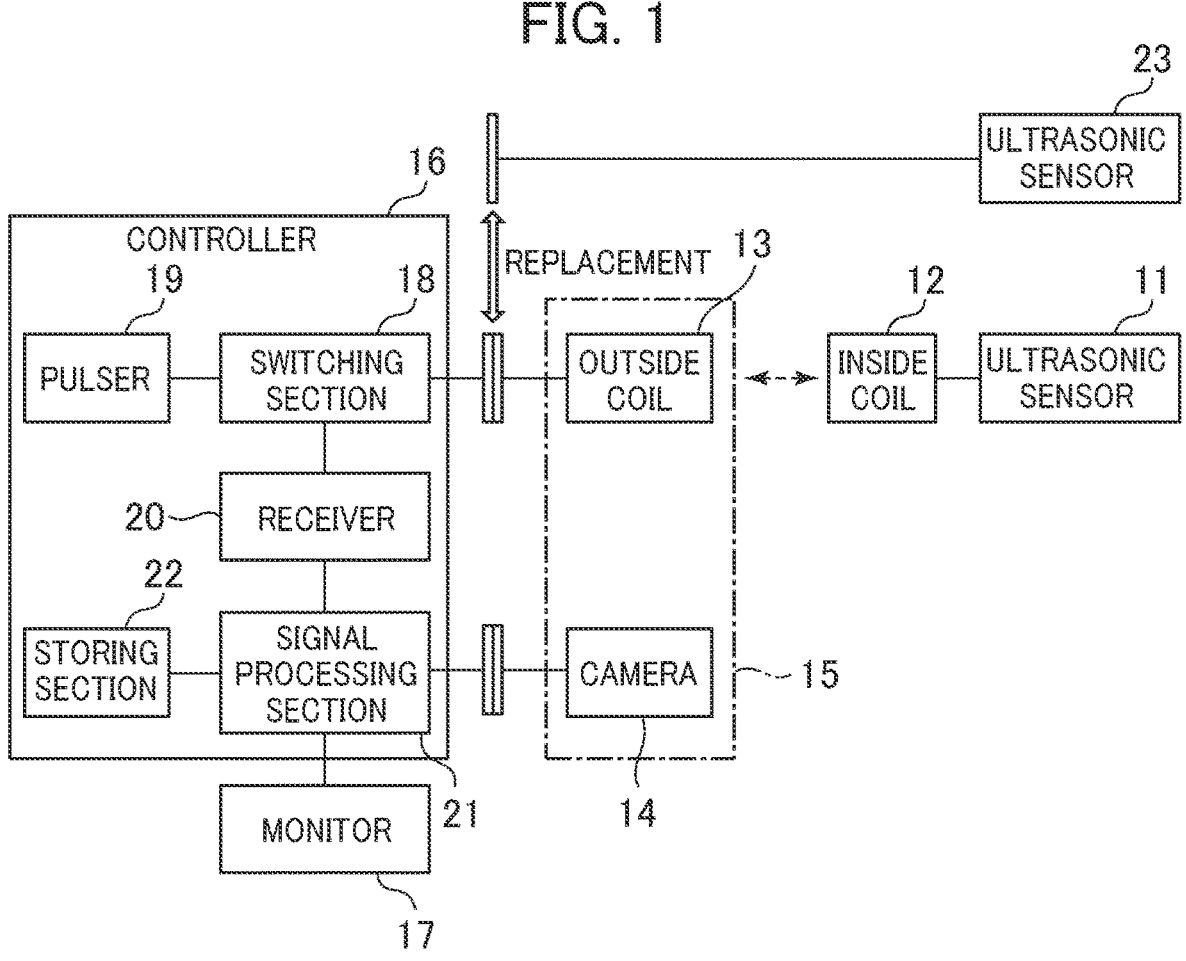
FIG. 1 is a block diagram that represents a configuration of a pipe inspection apparatus in one embodiment of the present invention.
Figure 2:
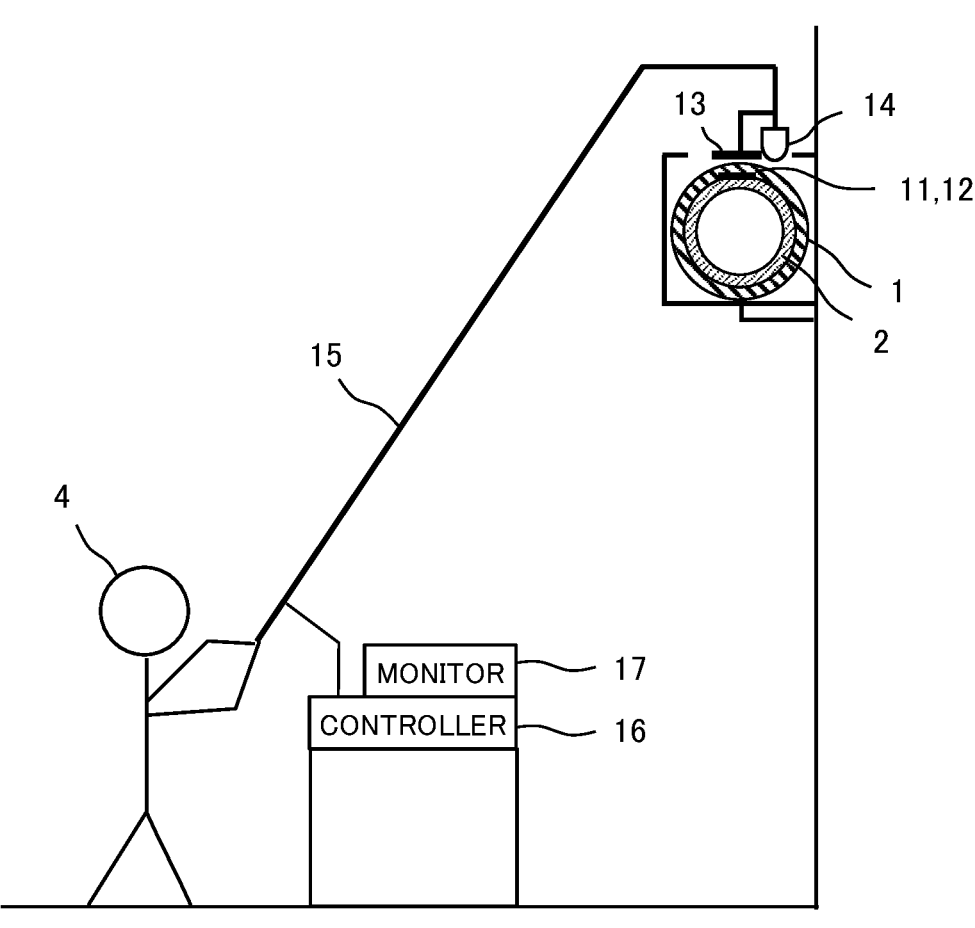
FIG. 2 is a schematic diagram that represents an access tool and a use method thereof in the one embodiment of the present invention.
Figure 3:
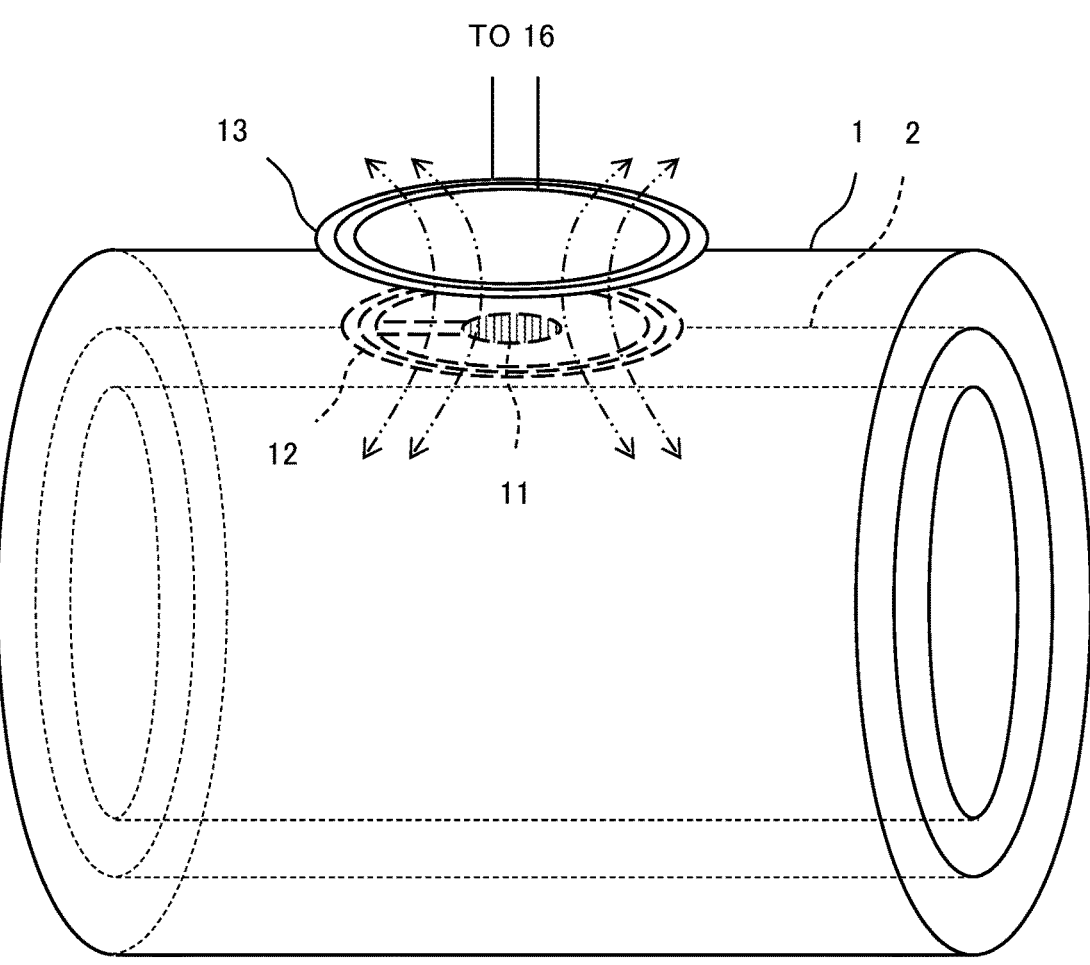
FIG. 3 is a schematic diagram that represents an arrangement of a first ultrasonic sensor, an inside coil, and an outside coil in the one embodiment of the present invention.
Figure 4:
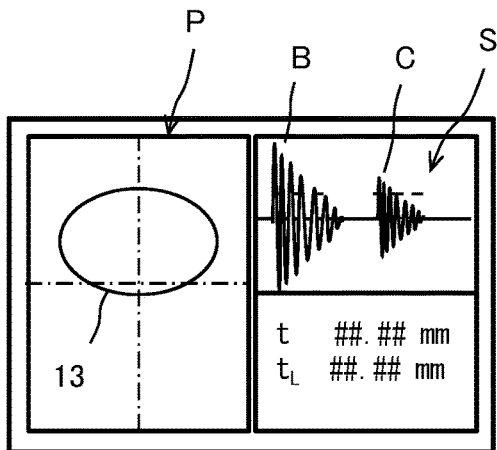
FIG. 4 is a diagram that represents a screen of a monitor in the one embodiment of the present invention.

FIG. 1 is a block diagram that represents a configuration of a pipe inspection apparatus in the present embodiment. FIG. 2 is a schematic diagram that represents an access tool and a use method thereof in the present embodiment. FIG. 3 is a schematic diagram that represents an arrangement of a first ultrasonic sensor, an inside coil, and an outside coil in the present embodiment. FIG. 4 is a diagram that represents a screen of a monitor in the present embodiment. In FIG. 1 to FIG. 3, only one set of an ultrasonic sensor and an inside coil in a plurality of sets of ultrasonic sensors and inside coils is illustrated.

The pipe inspection apparatus of the present embodiment includes a plurality of ultrasonic sensors 11 (first ultrasonic sensors) fixed in advance to the inside of a thermal insulator 1 and to the outer surface of a pipe 2 with the interposition of an adhesive 3 (see FIG. 5A or FIG. 6A to be described later), a plurality of inside coils 12 that are disposed inside the thermal insulator 1 in advance and are each connected to a respective one of the plurality of ultrasonic sensors 11 through a wiring line, an outside coil 13, and a camera 14. The pipe inspection apparatus includes also an access tool 15 that holds the outside coil 13 and the camera 14, a controller 16 connected to the outside coil 13 and the camera 14 through wiring lines and connectors, and a monitor 17 connected to the controller 16 through a wiring line.

The access tool 15 is configured by a rod illustrated in FIG. 2, for example. The tip side thereof holds the outside coil 13 and the camera 14, and the base end side thereof is grasped by a worker. In a case in which the pipe 2 exists at a high place, a worker 4 on a floor can dispose the outside coil 13 and the camera 14 outside the thermal insulator 1 that coats the outer surface of the pipe 2, by using the access tool 15.

The thermal insulator 1 has a plurality of marks each indicating the position of a respective one of the plurality of inside coils 12, for example. The worker sequentially selects one inside coil 12 from the plurality of inside coils 12 and disposes the outside coil 13 in such a manner that the outside coil 13 faces the selected inside coil 12. The controller 16 executes input and output of signals with the corresponding ultrasonic sensor 11 by using electromagnetic induction between the selected inside coil 12 and the outside coil 13 (specifically, conversion from an electrical signal to a magnetic flux by one coil and reconversion from the magnetic flux to the electrical signal by the other coil).

The controller 16 has a switching section 18, a pulser 19, a receiver 20, a signal processing section 21, and a storing section 22. The switching section 18 is configured by a multiplexer or the like. The signal processing section 21 is configured by a processor or the like that executes processing in accordance with a program. The storing section 22 is configured by a hard disk, memory, or the like.

The switching section 18 of the controller 16 connects the pulser 19 and the receiver 20, while switching between them, to the outside coil 13. The pulser 19 of the controller 16 outputs a pulse signal (electrical signal) to the ultrasonic sensor 11 through the outside coil 13 and the inside coil 12. A piezoelectric element of the ultrasonic sensor 11 vibrates by the pulse signal and transmits ultrasonic waves to the pipe 2. The piezoelectric element of the ultrasonic sensor 11 receives the ultrasonic waves reflected by the outer surface and the inner surface of the pipe 2, converts the received ultrasonic waves to a waveform signal (electrical signal), and outputs the waveform signal to the controller 16 through the inside coil 12 and the outside coil 13. The ultrasonic sensor 11 stores identification information and outputs the identification information to the controller 16 through the inside coil 12 and the outside coil 13.

The receiver 20 of the controller 16 digitizes the waveform signal and the identification information of the ultrasonic sensor 11 and outputs them to the signal processing section 21. The storing section 22 of the controller 16 stores a relation between the identification information and the fixing position of the ultrasonic sensor 11 in advance. The signal processing section 21 of the controller 16 acquires the fixing position of the ultrasonic sensor 11 by the identification information input from the ultrasonic sensor 11, by using the relation stored in the storing section 22. Then, the signal processing section 21 causes an input waveform signal S of the ultrasonic sensor 11 to be stored in the storing section 22 in association with the position of the ultrasonic sensor 11 and be displayed on the monitor 17 (see FIG. 4).

Figure 5A:
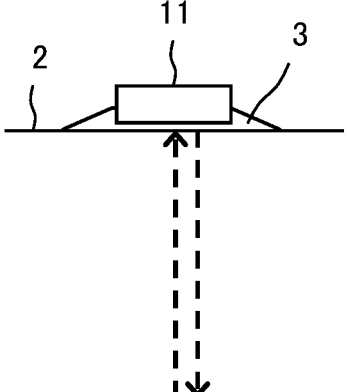
FIGS. 5A and 5B are diagrams that represent a waveform signal obtained when wall thinning of a pipe has not occurred in the one embodiment of the present invention.
Figure 5B:
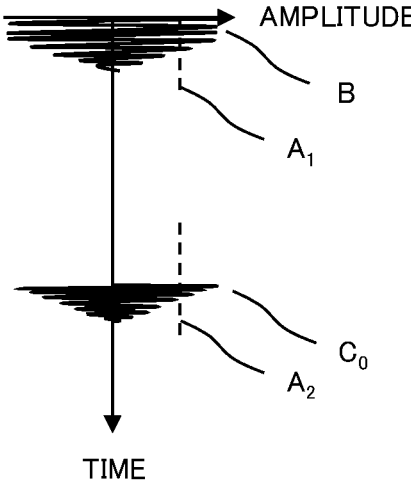

The signal processing section 21 of the controller 16 extracts a propagation time of ultrasonic waves (outer surface echo) B reflected by the outer surface of the pipe 2 and a propagation time of ultrasonic waves (inner surface echo) Co reflected by the inner surface of the pipe 2, by using gates $A_1$ and $A_2$ (specifically, anticipated ranges of the time and the amplitude), from a waveform signal $S_0$ (see FIG. 5B) of the ultrasonic sensor 11 acquired in an initial period, that is, when wall thinning of the pipe 2 has not occurred as illustrated in FIG. 5A, and computes an initial value to of the thickness of the pipe 2 on the basis of the difference between the propagation times. Then, a threshold $t_L$ of the thickness for determining whether or not wall thinning of the pipe 2 has occurred is set based on the initial value $t_0$ of the thickness and is stored in the storing section 22.

Figure 6A:
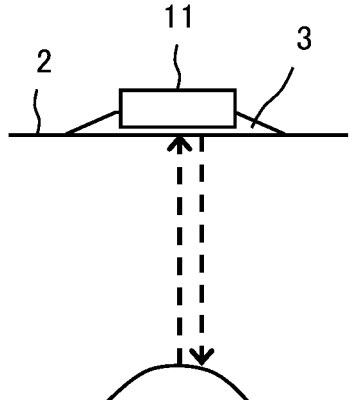
FIGS. 6A and 6B are diagrams that represent a waveform signal obtained when wall thinning of the pipe has occurred in the one embodiment of the present invention.
Figure 6B:
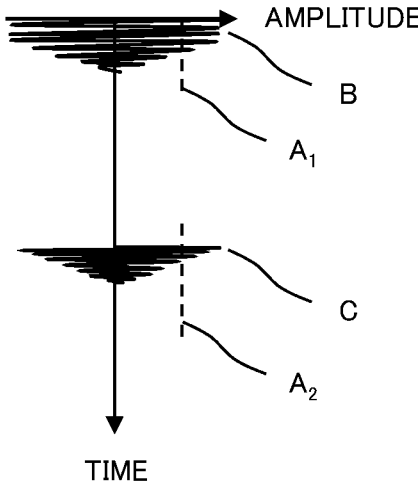

The signal processing section 21 of the controller 16 extracts the propagation time of the ultrasonic waves B reflected by the outer surface of the pipe 2 and the propagation time of ultrasonic waves C reflected by the inner surface of the pipe 2, by using the gates $A_1$ and $A_2$, from the waveform signal S (see FIG. 6B) of the ultrasonic sensor 11 acquired after the elapse of a predetermined time, that is, when wall thinning of the pipe 2 has occurred as illustrated in FIG. 6A, for example, and computes a thickness t of the pipe 2 on the basis of the difference between the propagation times. Then, the signal processing section 21 displays the thickness t on the monitor 17 together with the above-described threshold t of the thickness (see FIG. 4).

The signal processing section 21 of the controller 16 processes video P from the camera 14 and displays the video P on the monitor 17 (see FIG. 4).

Figure 7:
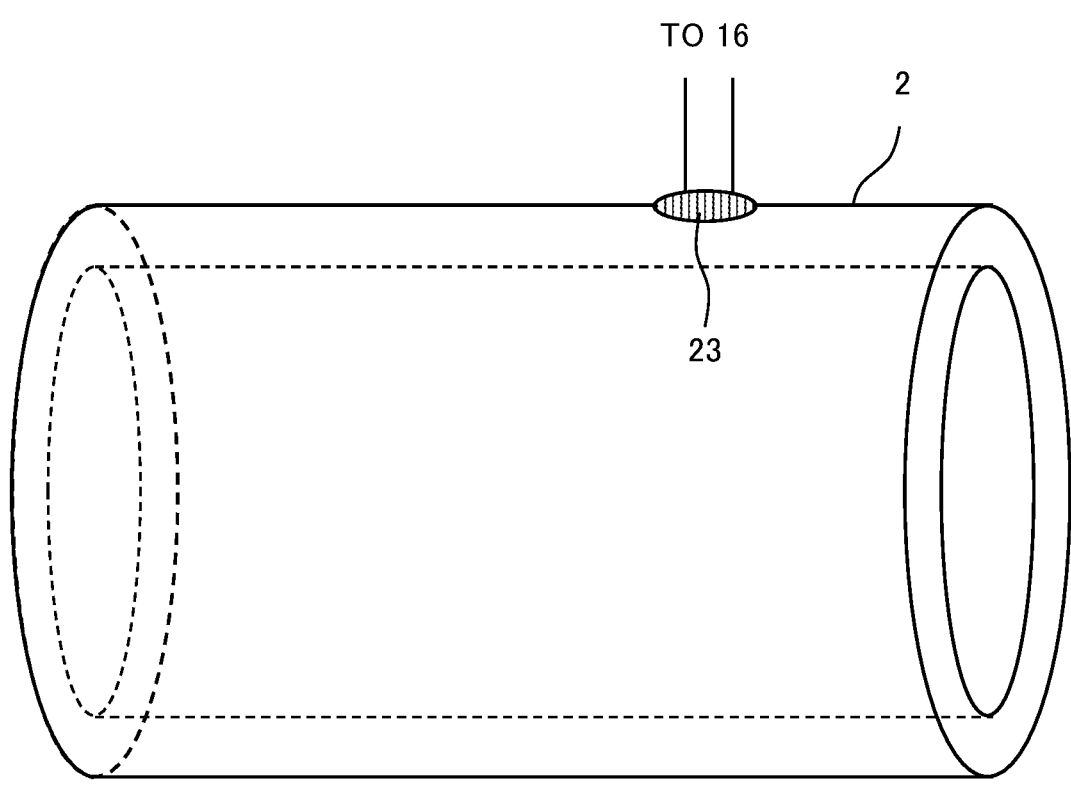
FIG. 7 is a schematic diagram that represents an arrangement of a second ultrasonic sensor in the one embodiment of the present invention.

The pipe inspection apparatus of the present embodiment further includes an ultrasonic sensor 23 (second ultrasonic sensor) that can be connected to the controller 16 through a wiring line and a connector, instead of the outside coil 13. The ultrasonic sensor 23 can be changed in its disposing position on the outer surface of the pipe 2 when the thermal insulator 1 is removed from the pipe 2 as illustrated in FIG. 7.

The controller 16 executes input and output of signals with the ultrasonic sensor 23 in the case in which the ultrasonic sensor 23 is connected thereto. Specifically, the pulser 19 of the controller 16 outputs a pulse signal to the ultrasonic sensor 23. A piezoelectric element of the ultrasonic sensor 23 vibrates by the pulse signal and transmits ultrasonic waves to the pipe 2. The piezoelectric element of the ultrasonic sensor 23 receives the ultrasonic waves reflected by the outer surface and the inner surface of the pipe 2, converts the received ultrasonic waves to a waveform signal, and outputs the waveform signal to the controller 16.

The signal processing section 21 of the controller 16 extracts a propagation time of ultrasonic waves reflected by the outer surface of the pipe 2 and a propagation time of ultrasonic waves reflected by the inner surface of the pipe 2, by using the gates $A_1$ and $A_2$, from the waveform signal of the ultrasonic sensor 23, and computes a thickness t of the pipe 2 on the basis of the difference between the propagation times. Then, the signal processing section 21 displays the thickness t on the monitor 17 together with the threshold $t_L$ of the thickness.

Next, a pipe inspection method using the above-described pipe inspection apparatus will be described. FIG. 8 is a flowchart that represents a procedure of the pipe inspection method in the present embodiment.

First, in a step S1, the worker 4 on the floor disposes the outside coil 13 and the camera 14 outside the thermal insulator 1 by using the access tool 15 (see the above-described FIG. 2). At this time, the worker 4 selects one inside coil 12 from the plurality of inside coils 12 and disposes the outside coil 13 in such a manner that the outside coil 13 faces the selected inside coil 12. Further, the worker 4 confirms approach between the outside coil 13 and the inside coil 12 by the image P or the waveform signal S displayed on the monitor 17.

Thereafter, the procedure proceeds to a step S2, and the worker 4 on the floor measures the thickness t at the position of the ultrasonic sensor 11, that is, a representative position (for example, position set at an interval of 50 mm) on the pipe 2, by using the ultrasonic sensor 11, the inside coil 12, the outside coil 13, and the controller 16. Thereafter, the procedure proceeds to a step S3, and the worker 4 judges whether or not there is an abnormality in the thickness of the pipe 2 at the representative position, on the basis of whether or not the thickness t of the pipe 2 displayed on the monitor 17 is equal to or smaller than the threshold $t_L$.

When there is not an abnormality in the thickness of the pipe 2 at the representative position, the procedure moves to a step S4. In the step S4, the worker 4 on the floor photographs the thermal insulator 1 by using the camera 14. Thereafter, the procedure proceeds to a step S5, and the worker 4 judges whether or not there is an abnormality (for example, deformation, discoloration, or crack) in the appearance of the thermal insulator 1, by the image P displayed on the monitor 17.

The above-described steps S1 to S5 are repeatedly executed with change in the position of the outside coil 13, that is, the representative position on the pipe 2. The procedure moves to a step S6 when there is an abnormality in the thickness of the pipe 2 at any representative position or when there is an abnormality in the appearance of the thermal insulator 1.

In the step S6, the worker 4 connects the ultrasonic sensor 23 to the controller 16 through a wiring line and a connector. Further, the worker 4 assembles a scaffold (not illustrated) for approaching the pipe 2 and executing work. Then, the worker 4 on the scaffold removes the thermal insulator 1 from the pipe 2. Thereafter, the procedure proceeds to a step S7, and the worker 4 on the scaffold disposes the ultrasonic sensor 23 at another position (for example, position set at an interval of 20 mm) other than the representative position on the outer surface of the pipe 2. Thereafter, the procedure proceeds to a step S8, and the worker 4 measures the thickness t at the position of the ultrasonic sensor 23, that is, the other position on the pipe 2, by using the ultrasonic sensor 23 and the controller 16.

As above, in the present embodiment, screening inspection through the steps S1 to S5 is executed. In this screening inspection, the outside coil 13 and the camera 14 are disposed outside the thermal insulator 1 by using the access tool 15. Then, the thickness of the pipe 2 at the representative position is measured by using the ultrasonic sensor 11, the inside coil 12, the outside coil 13, and the controller 16. In addition, the thermal insulator 1 is photographed by using the camera 14. Thus, assembly of a scaffold becomes unnecessary. Further, when an abnormality is not found in the screening inspection, the thermal insulator 1 is not removed from the pipe 2. Therefore, the pipe inspection can be executed with reduction in work accompanying the inspection, such as assembly of a scaffold and attachment and detachment of the thermal insulator. As a result, for example, the work burden and the work time of regular checks can be reduced.

Moreover, in the present embodiment, when an abnormality is found in the screening inspection, a scaffold is assembled, and the thermal insulator 1 is removed from the pipe 2. Then, the thickness t of the pipe 2 at another position other than the representative position is measured by using the ultrasonic sensor 23 and the controller 16. Therefore, it is possible to recognize the wall thinning range of the pipe 2 and consider a countermeasure such as replacement of the pipe 2.

In the above-described one embodiment, description has been made by taking as an example the case in which the pipe inspection apparatus includes the controller 16 for use in common to the ultrasonic sensor 11 and the ultrasonic sensor 23. However, the pipe inspection apparatus is not limited to this example. The pipe inspection apparatus may include a first controller that executes input and output of signals with the ultrasonic sensor 11 through the outside coil 13 and the inside coil 12 and a second controller that executes input and output of signals with the ultrasonic sensor 23.

Figure 9:
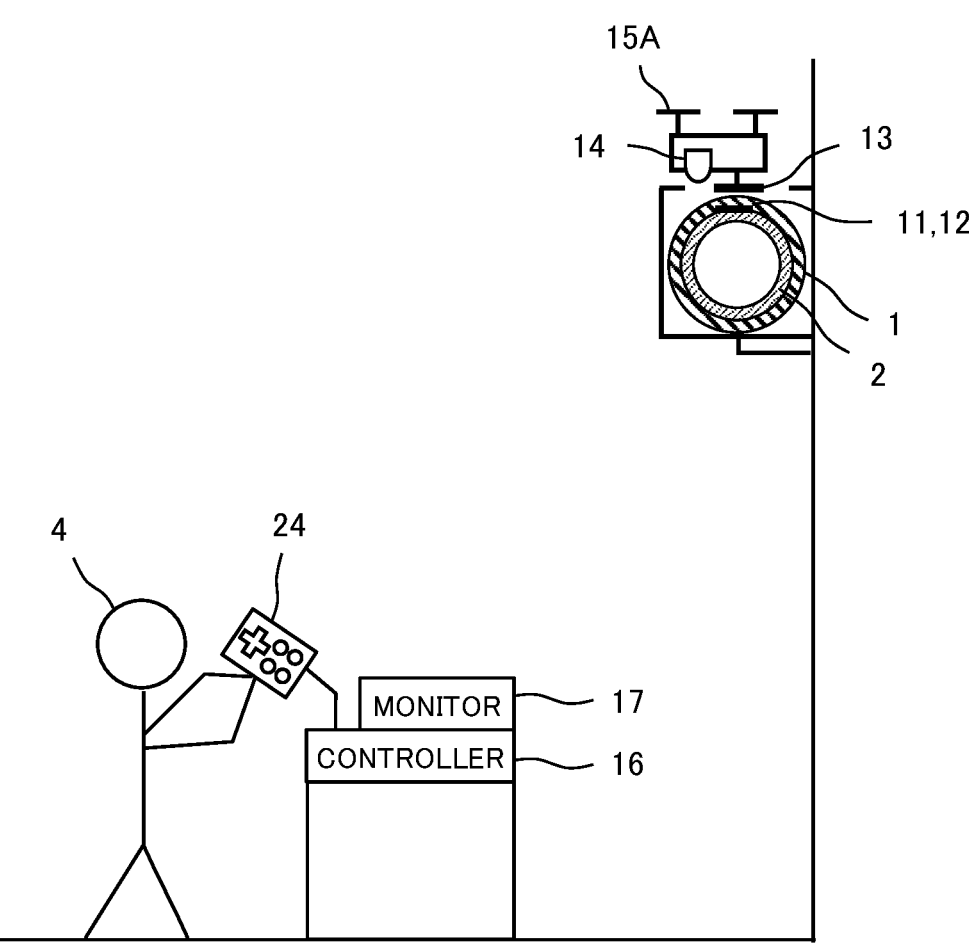
FIG. 9 is a schematic diagram that represents an access tool and a use method thereof in one modification example of the present invention.

Further, in the above-described one embodiment, description has been made by taking as an example the case in which the access tool 15 is configured by a rod that the worker grasps. However, the access tool is not limited to this example. As in a modification example illustrated in FIG. 9, an access tool 15A may be configured by a flying object that a worker remotely operates (specifically, flying object that moves in response to a command from an operation device 24 operated by a worker).

Moreover, in the above-described one embodiment, description has been made by taking as an example the case in which the controller 16 displays on the monitor 17 the waveform signal S of the ultrasonic sensor 11 acquired through approach between the outside coil 13 and the inside coil 12. However, the controller 16 is not limited to this example. The controller 16 may detect whether or not the outside coil 13 and the inside coil 12 have approached each other, on the basis of the amplitude of the waveform signal S of the ultrasonic sensor 11. Then, when detecting approach between the outside coil 13 and the inside coil 12, the controller 16 may inform about this approach by use of informing equipment (specifically, for example, a message may be displayed on the monitor 17, or a buzzer may be caused to sound).

DESCRIPTION OF REFERENCE CHARACTERS

1: Thermal insulator
2: Pipe
11: Ultrasonic sensor (first ultrasonic sensor)
12: Inside coil
13: Outside coil
14: Camera
15, 15A: Access tool
16: Controller
23: Ultrasonic sensor (second ultrasonic sensor)
What is claimed is:

1. A pipe inspection method comprising:
a first process of disposing an outside coil and a camera outside a thermal insulator that coats an outer surface of a pipe, by using an access tool that holds the outside coil and the camera;
a second process of measuring a thickness of the pipe at a position of a first ultrasonic sensor fixed in advance to inside of the thermal insulator and to the outer surface of the pipe, by using the first ultrasonic sensor, an inside coil that is disposed inside the thermal insulator in advance and is connected to the first ultrasonic sensor, the outside coil disposed outside the thermal insulator in such a manner as to face the inside coil in the first process, and a controller that executes input and output of signals with the first ultrasonic sensor by using electromagnetic induction between the inside coil and the outside coil, and judging whether or not there is an abnormality in the thickness of the pipe;
a third process of photographing the thermal insulator by using the camera disposed outside the thermal insulator in the first process, and judging whether or not there is an abnormality in appearance of the thermal insulator;
a fourth process of removing the thermal insulator from the pipe when it is judged that there is an abnormality in the thickness of the pipe in the second process or when it is judged that there is an abnormality in the appearance of the thermal insulator in the third process;
a fifth process of disposing a second ultrasonic sensor on the outer surface of the pipe from which the thermal insulator has been removed in the fourth process; and
a sixth process of measuring the thickness of the pipe at a position of the second ultrasonic sensor by using the second ultrasonic sensor disposed on the outer surface of the pipe in the fifth process and a controller that executes input and output of signals with the second ultrasonic sensor.

2. The pipe inspection method according to claim 1, wherein
the second process measures the thickness of the pipe at a representative position, and
the sixth process measures the thickness of the pipe at another position other than the representative position.

3. The pipe inspection method according to claim 1, wherein
the access tool is configured by a rod that a worker grasps.

4. The pipe inspection method according to claim 1, wherein
the access tool is configured by a flying object that a worker remotely operates.

5. The pipe inspection method according to claim 1, wherein
the first ultrasonic sensor stores and outputs identification information, and
the controller is configured to store a relation between the identification information and a fixing position of the first ultrasonic sensor in advance and acquire the fixing position of the first ultrasonic sensor by the identification information input from the first ultrasonic sensor.

6. The pipe inspection method according to claim 1, wherein
the controller is configured to display on a monitor a waveform signal of the first ultrasonic sensor acquired through approach between the outside coil and the inside coil, or inform about approach between the outside coil and the inside coil by use of informing equipment.

\* \* \* \* \*